US008392006B2

(12) United States Patent
Gehring et al.

(10) Patent No.: US 8,392,006 B2
(45) Date of Patent: Mar. 5, 2013

(54) DETECTING IF AN AUDIO STREAM IS MONOPHONIC OR POLYPHONIC

(75) Inventors: Steffen Gehring, Hamburg (DE); Christof Adam, Norderstedt (DE)

(73) Assignee: Apple Inc., Cupertino, CA (US)

( * ) Notice: Subject to any disclaimer, the term of this patent is extended or adjusted under 35 U.S.C. 154(b) by 345 days.

(21) Appl. No.: 12/814,867

(22) Filed: Jun. 14, 2010

(65) Prior Publication Data

US 2011/0307084 A1 Dec. 15, 2011

(51) Int. Cl.
*G06F 17/00* (2006.01)

(52) U.S. Cl. ........................................................ 700/94

(58) Field of Classification Search ..................... 700/94
See application file for complete search history.

(56) References Cited

U.S. PATENT DOCUMENTS

| | | | | |
|---|---|---|---|---|
| 5,210,796 | A | 5/1993 | Hirabayashi et al. | |
| 5,414,774 | A | 5/1995 | Yumoto | |
| 6,140,568 | A * | 10/2000 | Kohler | 84/616 |
| 2001/0053227 | A1 | 12/2001 | Narasimhan | |
| 2012/0067194 | A1 * | 3/2012 | Nielsen et al. | 84/454 |

FOREIGN PATENT DOCUMENTS

| | | | |
|---|---|---|---|
| EP | 1191818 | A2 | 3/2002 |
| WO | WO/2008/056412 | A1 | 5/2008 |

OTHER PUBLICATIONS

M.D. Plumbley et. al, Automatic Music Transcription and Audio Source Separation, 2002, Taylor & Francis, Cybernetics and Systems, 33: 603-627.*

Klapuri, Multiple Fundamental Frequency Estimation Based on Harmonicity and Spectral Smoothness, Nov. 2003, IEEE Transcations on Speech and Audio Processing, vol. 11, No. 6.*

Pertusa et. al, Multiple Fundamental Frequency Estimation Based on Spectral Pattern Loudness and Smoothness, 2007, Austrian Computer Society.*

* cited by examiner

*Primary Examiner* — Andrew C Flanders
*Assistant Examiner* — David Siegel
(74) *Attorney, Agent, or Firm* — Blakely, Sokoloff, Taylor & Zafman LLP

(57) ABSTRACT

The disclosed technology provides for determining whether an audio stream is monophonic or polyphonic. An exemplary method includes analyzing and detecting frequency peaks in a portion of the audio stream. The method includes determining whether the portion of the audio stream is monophonic, by determining if all detected peaks are integer intervals of a lowest detected frequency peak. The method then includes determining that the audio stream portion is monophonic if a greatest common devisor frequency exists between a threshold frequency and the lowest detected frequency peak, wherein each detected peak is an integer multiple of the greatest common devisor frequency. The method includes determining that the portion of the audio stream is polyphonic if any one of the detected peaks is not substantially an integer multiple of the lowest detected frequency and if no greatest common devisor frequency exists between the threshold frequency and the lowest detected frequency peak.

26 Claims, 7 Drawing Sheets

DETECTING IF AN AUDIO STREAM IS MONOPHONIC OR POLYPHONIC

FIELD

The following relates to determining if an audio stream is polyphonic or monophonic.

BACKGROUND

In general, sounds can be monophonic or polyphonic. Monophonic sounds emanate from a single voice. Examples of instruments that produce a monophonic sound are a singer's voice, a clarinet, and a trumpet. Polyphonic sounds emanate from groups of voices. For example, a guitar can create a polyphonic sound if a player excites multiple strings to form a chord. Other examples of instruments that can create a polyphonic sound include a chorus of singers, or a quartet of stringed instruments.

Digital audio workstations (DAWs) can provide a vast array of processes for altering audio streams. Different processes can be best suited for different types of audio streams. For example, a polyphonic time-stretching algorithm can provide the best results for a polyphonic audio stream while a monophonic time-stretching algorithm can provide the best results for a monophonic audio stream. In these examples, a user must know whether a given audio stream is monophonic or polyphonic and then manually apply the appropriate algorithm to achieve the best results. Or alternatively, a user can simply randomly choose algorithms to apply and tinker until they hear desired results.

However, current methods do not determine whether an audio stream is monophonic or polyphonic and then automatically apply an appropriate process to the audio stream based on the determination. Therefore, users, particularly novice users, could benefit from an improved method and system for determining whether an audio stream is polyphonic or monophonic and automatically applying an appropriate process to the audio stream based on this determination.

SUMMARY

The disclosed method, apparatus, and computer-readable medium provides for determining if an audio stream is polyphonic or monophonic and automatically applying an appropriate audio processing algorithm to the stream based on the determination. The method is exemplary and includes analyzing audio data in a selected portion of an audio stream. The method includes detecting a plurality of frequency peaks in the audio data, where each detected peak has minimum predefined amplitude. The method then includes determining whether the selected portion of the audio stream contains monophonic audio data by considering a lowest detected frequency peak as corresponding to a fundamental frequency F0. The method then includes comparing the fundamental frequency F0 with a predetermined number of successive detected peaks of the plurality of detected frequency peaks. The method then includes determining that the selected portion of the audio stream contains monophonic audio data if each successive detected peak is substantially an integer multiple of the fundamental frequency F0.

If at least one successive detected frequency peak is not substantially an integer multiple of the fundamental frequency F0, considered as the lowest detected frequency peak, the method tests for a monophonic stream with a missing fundamental frequency. The method accomplishes this by determining that the selected portion of the audio stream contains monophonic data if a greatest common devisor frequency exists between a threshold frequency, such as 40 Hz, and the lowest detected frequency peak, wherein each detected peak is an integer multiple of the greatest common devisor frequency. If such a greatest common devisor is found the method determines that the audio stream portion is monophonic.

The method includes determining that the selected portion of the audio stream contains polyphonic audio data if any one of the successive detected peaks is not substantially an integer multiple of the fundamental frequency F0 and if no greatest common devisor frequency exists between the threshold frequency and the lowest detected frequency peak.

Many other aspects and examples will become apparent from the following disclosure.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION

The method for determining whether an audio stream is monophonic or polyphonic described herein can be implemented on a computer. The computer can be a data-processing system suitable for storing and/or executing program code. The computer can include at least one processor that is coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data-processing systems or remote printers or storage devices through intervening private or public networks. Modems, cable modems, and Ethernet cards are just a few of the currently available types of network adapters. In one or more embodiments, the computer can be a desktop computer, laptop computer, or dedicated device.

Figure 1:
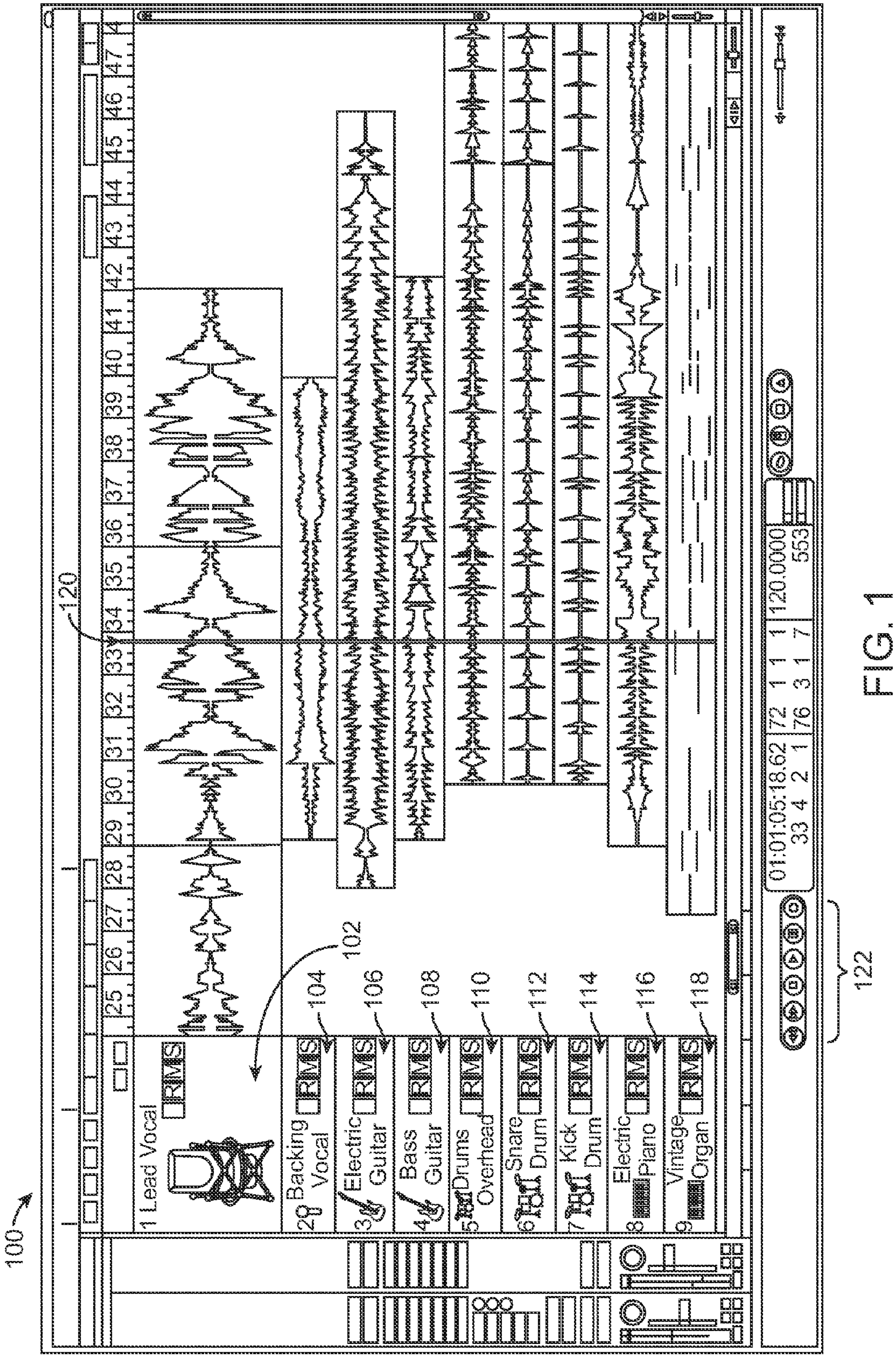
FIG. 1 illustrates a musical arrangement including MIDI and audio tracks.

FIG. 1 illustrates a musical arrangement as displayed on a digital audio workstation (DAW) including MIDI and audio tracks. The musical arrangement 100 can include one or more tracks, with each track having one or more audio files or MIDI files. Generally, each track can hold audio or MIDI files corresponding to each individual desired instrument in the arrangement. As shown, the tracks can be displayed horizontally, one above another. A playhead 120 moves from left to right as the musical arrangement is recorded or played. The playhead 120 moves along a timeline that shows the position of the playhead within the musical arrangement. The timeline indicates bars, which can be in beat increments. A transport bar 122 can be displayed and can include command buttons for playing, stopping, pausing, rewinding, and fast-forwarding the displayed musical arrangement. For example, radio buttons can be used for each command. If a user were to select the play button on transport bar 122, the playhead 120 would begin to move along the timeline, e.g., in a left-to-right fashion.

FIG. 1 illustrates an arrangement including multiple audio tracks including a lead vocal track 102, backing vocal track 104, electric guitar track 106, bass guitar track 108, drum kit overhead track 110, snare track 112, kick track 114, and electric piano track 116. FIG. 1 also illustrates a MIDI vintage organ track 118, the contents of which are depicted differently because the track contains MIDI data and not audio data.

Each of the displayed audio and MIDI files in the musical arrangement, as shown in FIG. 1, can be altered using a graphical user interface. For example, a user can cut, copy, paste, or move an audio file or MIDI file on a track so that it plays at a different position in the musical arrangement. Additionally, a user can loop an audio file or MIDI file so that it can be repeated; split an audio file or MIDI file at a given position; and/or individually time-stretch an audio file.

Figure 2:
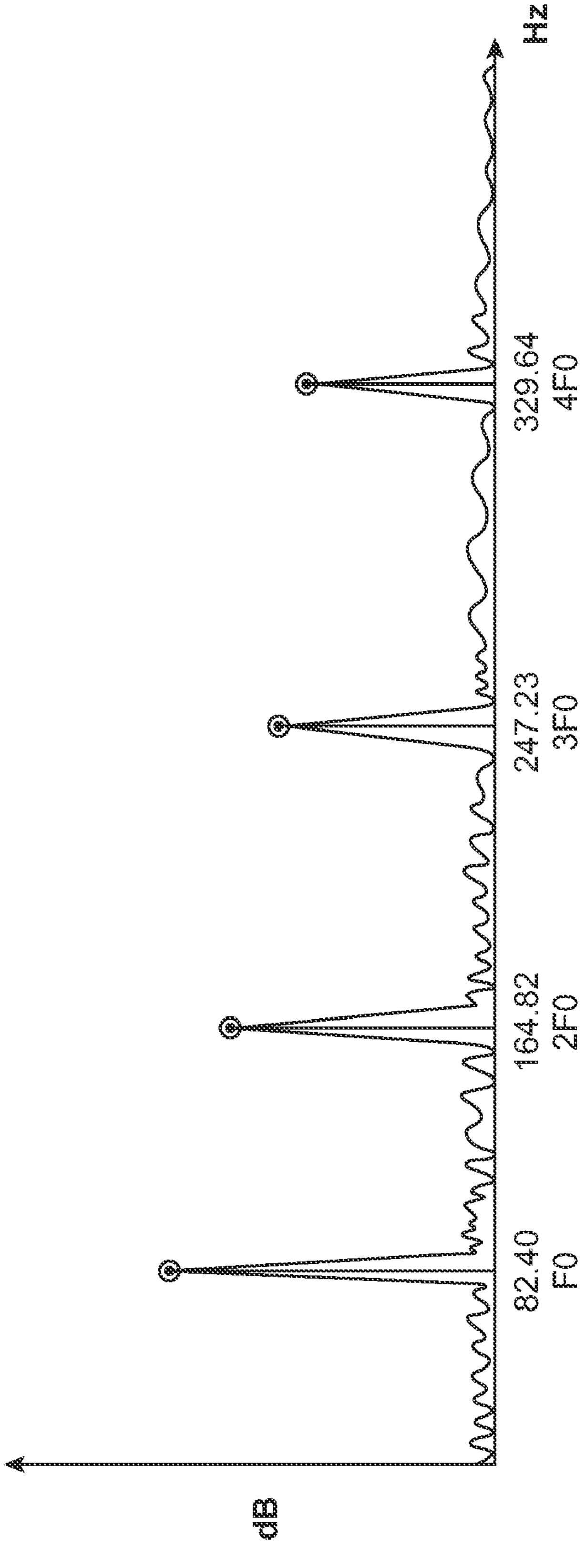
FIG. 2 illustrates a monophonic sound as displayed in a frequency domain.

FIG. 2 illustrates a frequency domain view for a portion of an audio stream. A system, as described herein, can convert the portion of the audio stream from a time domain representation to a frequency domain representation by using a Fast Fourier Transform. Other methods of transforming an audio signal from a time domain representation to a frequency domain representation can be used to achieve this result. FIG. 2 displays Hertz (Hz) along the x-axis and dB along the y-axis. FIG. 2 can correspond to the lead vocal track 102 from FIG. 1, which is a monophonic audio stream.

A system detects four peaks as shown in FIG. 2. A peak can be defined as any peak that exceeds a set threshold, such as 12 dB. The system then considers the lowest detected frequency peak as a selected frequency peak F0.

If the frequency of each subsequent peak is an integer or close to an integer-interval in defined error limits of the selected frequency peak, the system determines that the stream is monophonic. In other words, the subsequent peaks can be integer-intervals of the selected frequency peak, while still allowing for a tolerance in variation such as 2%.

As shown, in FIG. 2, the system selects F0 at 82.40 Hertz, the lowest detected frequency peak, as the selected frequency peak. In a preferred embodiment, the system allows a +−2% tolerance when searching for peaks.

In this example, the system now determines if the subsequent peaks are at integer-interval harmonic frequencies of the selected fundamental frequency F0. These three peaks can also be referred to as harmonic partials. The system finds a sufficient first peak at an integer-interval harmonic frequency 2(F0), or 164.82 Hz. The system finds a sufficient second peak at an integer-interval harmonic frequency 3(F0), or 247.23 Hz. The system finds a sufficient third peak at an integer-interval harmonic frequency 4(F0), or 329.64 Hz. Each peak can be deemed sufficient because it exceeds a set amplitude threshold, such as 10 dB.

Because the system has now found all three subsequent peaks at integer-interval harmonic frequencies of the selected fundamental frequency, an indication that the audio stream is monophonic is stored in computer memory. This computer memory can contain a monophonic score counter and polyphonic score counter for polyphonic or monophonic indications as this process is repeated for subsequent portions of the audio stream.

In a preferred embodiment, this process is repeated, for a predetermined number of times, to assist accuracy of monophonic or polyphonic determination. In this embodiment, an audio stream portion is evaluated every 256 samples for digital audio. If the audio signal portion is determined as being monophonic, the monophonic score counter is increased by one.

If the audio stream is evaluated as being polyphonic then a polyphonic counter is increased by one. If the audio stream portion does not contain any relevant peaks at all, none of the score counters is increased. This case can arise for silent passages in the audio stream. The scoring is done for a defined minimum number of audio stream portions so that the result becomes representative for the complete audio stream.

In this preferred embodiment a final result whether the complete audio stream is determined as monophonic or polyphonic is done by comparing the two scores. In this embodiment the final result equals the (monophonic score−polyphonic score)/(monophonic score+polyphonic score). In this embodiment, the final result is a value between −1 and +1. If the final result is greater than zero the stream is monophonic. If the final result is less than zero the stream is polyphonic. In this embodiment, the closer the result value is to either 1 or −1, the more robust the final result determination is.

In one example, the system engages the detection process every 256 samples for a digital audio signal recorded at CD quality (44,100 samples per second). This leads to the detection process engaging every 5.80 milliseconds.

Figure 3:
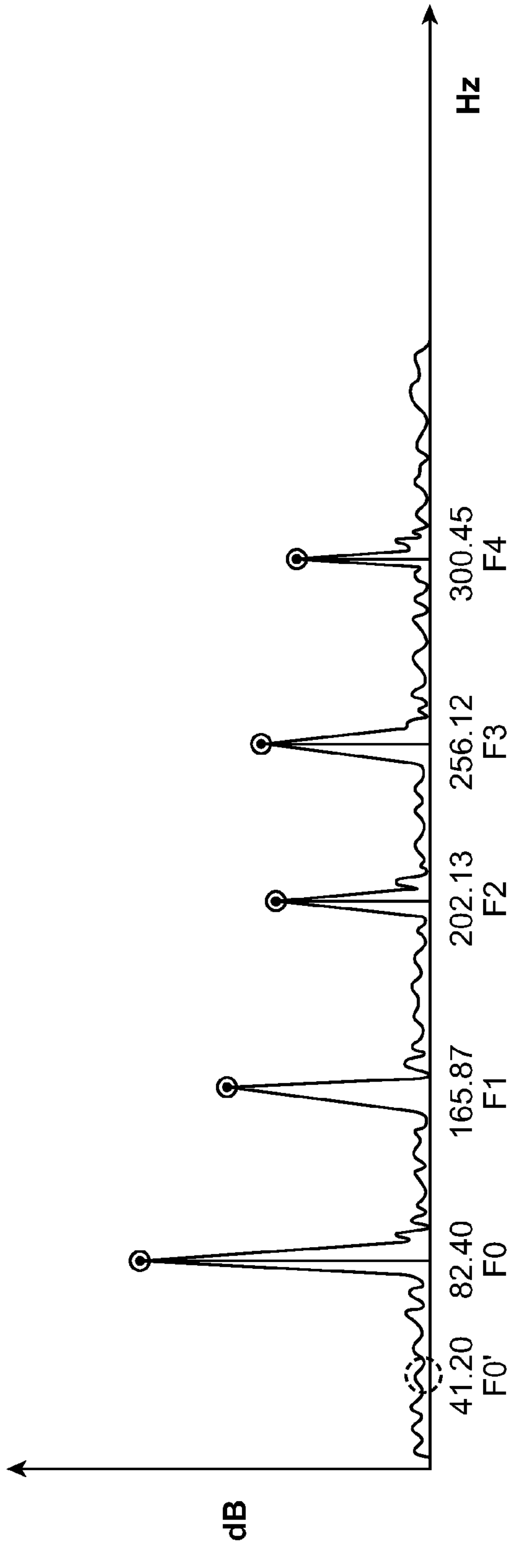
FIG. 3 illustrates a polyphonic sound as displayed in a frequency domain.

FIG. 3 illustrates a portion of a polyphonic sound as displayed in a frequency domain. As described above, a system can convert a portion of the audio stream from a time domain representation to a frequency domain representation by using a Fast Fourier Transform. Other methods of transforming an audio signal from a time domain representation to a frequency domain representation can be used to achieve this result. FIG. 3 displays Hertz (Hz) along the x-axis and dB along the y-axis. FIG. 3 can correspond to the electric guitar track 106 from FIG. 1, which is a polyphonic audio stream.

The system selects a lowest detected frequency as corresponding to a fundamental frequency F0. In one example, the system assigns the peak at F0 as a fundamental frequency because it exceeds a set value, such as 15 dB.

As shown, in FIG. 3, the system selects F0 at 82.40 Hertz, the lowest detected frequency peak, as a selected fundamental frequency peak. Here lowest detected frequency peak means the frequency peak lowest in frequency, not amplitude. In a preferred embodiment, the system allows a +−2% tolerance when searching for subsequent integer interval peaks.

In this example, the system now determines if the four subsequent peaks are at integer-interval harmonic frequencies of the selected fundamental frequency F0. The system finds a first subsequent peak at an integer-interval harmonic frequency F1, which is 2 times F0 or 165.87 Hz, within a 2% tolerance. The system finds a subsequent second peak at frequency F2, or 202.13. Hz. This peak at frequency F2, 202.13 Hz, is not at an integer interval of F0 (82.40 Hz). Therefore the audio stream portion illustrated in the frequency domain of FIG. 3 is not a monophonic stream with a fundamental frequency of 82.40 Hz. Furthermore, the subsequent frequency peak F3 at 256.12 Hz, and the subsequent frequency peak F4 at 300.45 Hz are not integer intervals of F0 82.40 illustrating that the audio stream portion of FIG. 3 is not a monophonic stream with a fundamental frequency of 82.40 Hz.

The system can now determine if a greatest common devisor frequency exists, between a threshold frequency 40 Hz and the lowest detected frequency peak at 82.40 Hz, so that the detected peaks are integer intervals of this greatest common devisor. This allows the system to determine if the audio stream is a monophonic stream with a hidden or missing fundamental frequency. Because no greatest common devisor frequency exists for the example shown in FIG. 3, the audio stream portion is determined to be polyphonic.

In this example, the system can sweep through all frequencies between the threshold frequency 40 Hz and the lowest detected peak 82.40 Hz and determine if a greatest common devisor frequency exists so that each peak is an integer multiple of the greatest common devisor.

As an illustrative example, the system can select a potential greatest common devisor frequency F0' at 41.20 Hz. The system then determines that the audio stream is not monophonic with a fundamental frequency of 41.20 Hz because all subsequent peaks are not integer intervals of F0' (41.20 Hz). In the example shown in FIG. 3, the first subsequent frequency peak at 82.40 Hz is an integer interval of 41.20 Hz (two times greater). The second subsequent frequency peak at 165.87 is an integer interval of 41.20 Hz (three times greater). The third subsequent frequency peak at 202.13 Hz is not an integer interval of 41.20 Hz. Therefore, the system determines that the audio stream portion shown in FIG. 3 is polyphonic. If any other subsequent frequency peak is not an integer interval of 41.20 Hz the system will determine that the audio stream is polyphonic. In this example, the subsequent frequency peak at 256.12 Hz and the subsequent frequency peak at 300.45 Hz are not integer intervals of 41.20 Hz. This determination that the audio stream portion is polyphonic can be stored in a computer memory.

As described above, this computer memory can contain a monophonic count and polyphonic count for polyphonic or monophonic indications as this process is repeated for subsequent portions of the audio stream.

Figure 4:
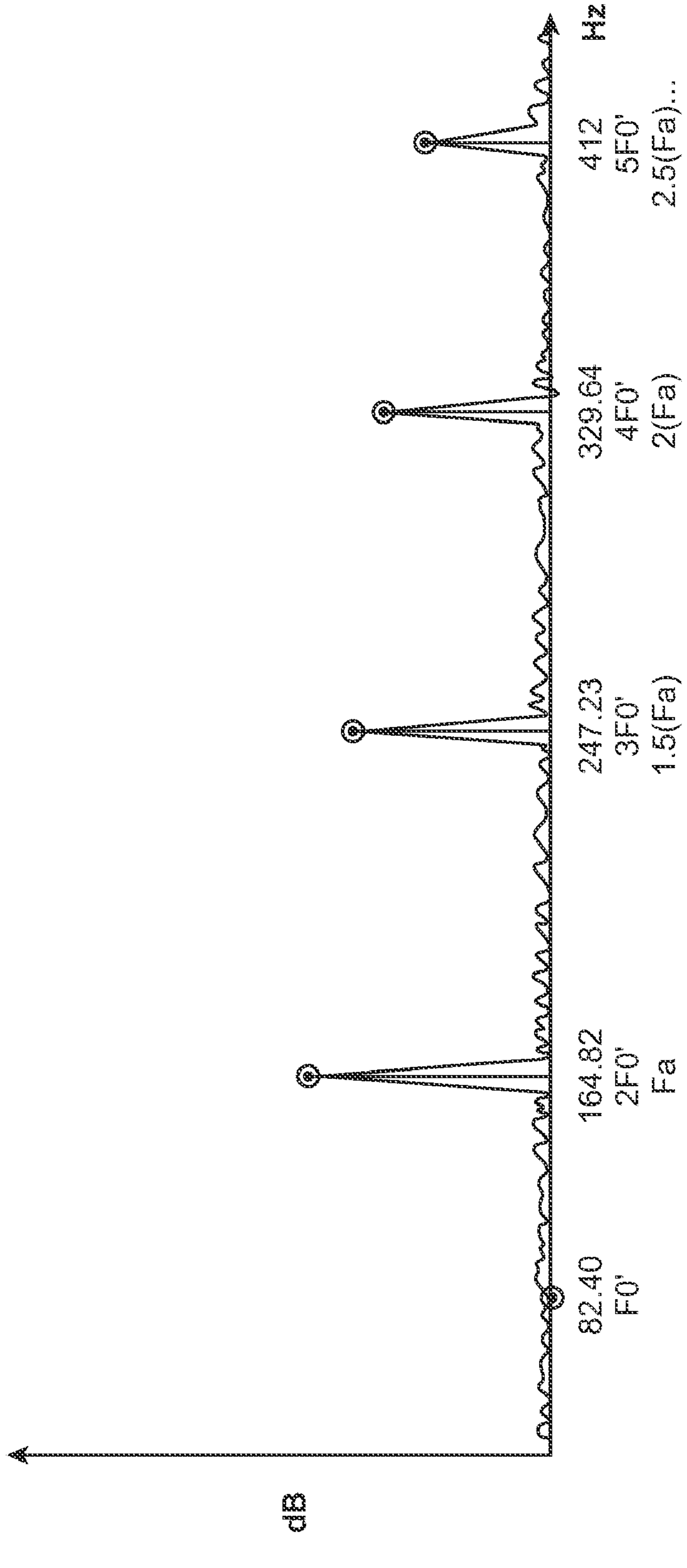
FIG. 4 illustrates a monophonic sound as displayed in a frequency domain, in which a missing fundamental frequency is identified.

FIG. 4 illustrates a monophonic sound as displayed in a frequency domain with a missing fundamental frequency. As described above, a system can convert a portion of the audio stream from a time domain representation to a frequency domain representation by using a Fast Fourier Transform. Other methods of transforming an audio signal from a time domain representation to a frequency domain representation can be used to achieve this result. FIG. 4 displays Hertz (Hz) along the x-axis and dB along the y-axis. FIG. 4 can correspond to the backing vocal track 104 from FIG. 1, which is a monophonic audio stream.

The system selects a lowest detected frequency as corresponding to a fundamental frequency Fa.

As shown, in FIG. 4, the system selects Fa at 164.82 Hertz, the lowest detected frequency peak, as a selected fundamental frequency peak. Here lowest detected frequency peak means the frequency peak lowest in frequency, not amplitude.

In this example, the system now determines if the three subsequent peaks are at integer-interval harmonic frequency of the selected fundamental frequency Fa. The system finds a subsequent second peak at frequency 247.23 Hz. This peak at frequency 247.23 Hz, is not at an integer interval of Fa (164.82 Hz). Therefore the audio stream portion illustrated in the frequency domain of FIG. 4 is not a monophonic stream with a fundamental frequency of 164.82 Hz. The subsequent frequency peak at 329.64 Hz is an integer interval of Fa, but this does not affect the determination that this audio stream portion is polyphonic because a non-integer frequency peak has already been found. Furthermore, the subsequent frequency peak 412.00 Hz is not an integer interval of Fa 164.82 Hz illustrating that the audio stream portion of FIG. 4 is not a monophonic stream with a fundamental frequency of 164.82 Hz.

In some circumstances, a monophonic signal portion's fundamental frequency can be missing. The system can now determine if this is a monophonic signal with a missing or ghost fundamental frequency. The system can accomplish this by determining if a greatest common devisor frequency exists, between a threshold frequency 40 Hz and the lowest detected frequency peak at 164.82 Hz, so that the detected peaks are integer intervals of this greatest common devisor. This allows the system to determine if the audio stream is a monophonic stream with a hidden or missing fundamental frequency. Because no greatest common devisor frequency exists for the example shown in FIG. 3, the audio stream portion is determined to be polyphonic.

In this example, the system can sweep through all frequencies between the threshold frequency 40 Hz and the lowest detected peak 164.82 Hz and determine if a greatest common devisor frequency exists so that each peak is an integer multiple of the greatest common devisor.

As an illustrative example, the system can select a potential greatest common devisor frequency F0' of half of the value of the lowest detected peak at 82.40 Hz, and determine if a predetermined number of successive peaks are integer intervals of this selected frequency peak F0'. The selected value 82.40 Hz is within an appropriate range because it is larger than the threshold frequency 40 Hz and the lowest detected frequency peak at 164.82 Hz.

In this illustrative example the system has selected F0' at 82.40 Hz. The system will then determine that the audio stream is monophonic with a greatest common devisor frequency of 82.40 Hz if all subsequent peaks are integer intervals of F0' (82.40 Hz). In the example shown in FIG. 4, the first subsequent frequency peak at 164.82 Hz is an integer interval of F0' 82.40 Hz (two times larger). The second subsequent frequency peak at 247.23 is an integer interval of 82.40 Hz (three times greater). The third subsequent frequency peak at 329.64 Hz is an integer interval of 82.40 Hz (four times greater). The fourth subsequent frequency peak at 412.00 Hz is an integer interval of 82.40 Hz (five times greater).

Therefore, because all subsequent peaks are integer intervals of F0', the system determines that the audio stream portion shown in FIG. 3 is monophonic with a missing fundamental frequency and greatest common devisor frequency at 82.40 Hz. This determination that the audio stream portion is monophonic can be stored in a computer memory.

Furthermore, FIG. 4 illustrates that when an audio stream portion is monophonic with a missing fundamental frequency, the subsequent frequency peaks are not at integer intervals of the lowest detected frequency peak Fa. However, in the illustrated example when the greatest common devisor frequency is one-half the value of the lowest detected frequency the subsequent peaks do have a relationship to Fa. As shown, the second detected peak at 247.23 Hz is 1.5 times Fa. The third detected peak at 329.64 is 2 times Fa. The fourth detected peak at 412.00 Hz is 2.5 times Fa. Therefore, a pattern of a fundamental frequency Fa, followed by a peak at 1.5(Fa), followed by a peak at 2(Fa) followed by a peak at 2.5(Fa) and so on for all subsequent peaks can indicate that the audio stream portion is monophonic with a missing fundamental frequency, if the greatest common devisor is one-half the value of the lowest detected frequency peak.

Figure 5:
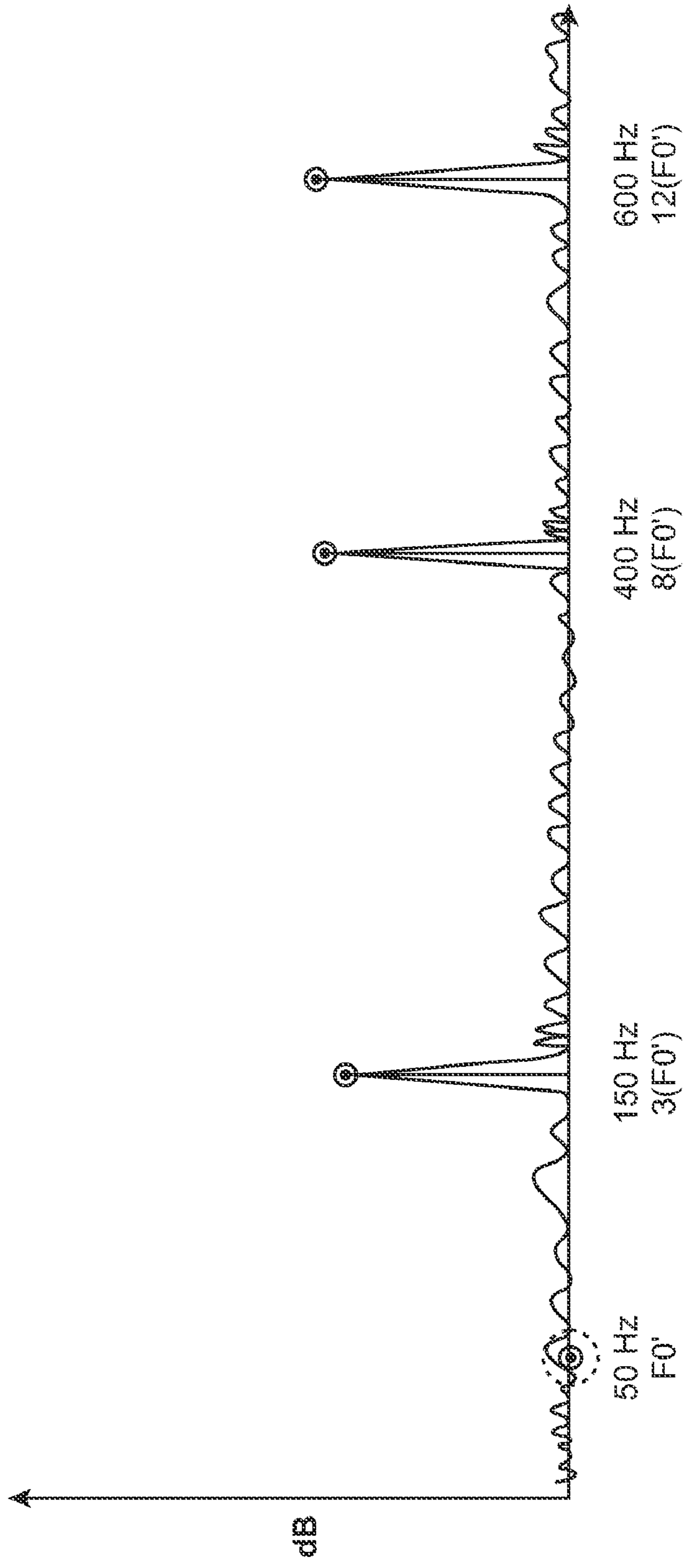
FIG. 5 illustrates a monophonic sound as displayed in a frequency domain, in which a missing fundamental frequency is identified.

FIG. 5 illustrates a monophonic sound as displayed in a frequency domain with a missing fundamental frequency. As described above, a system can convert a portion of the audio stream from a time domain representation to a frequency domain representation by using a Fast Fourier Transform. Other methods of transforming an audio signal from a time domain representation to a frequency domain representation can be used to achieve this result. FIG. 5 displays Hertz (Hz) along the x-axis and dB along the y-axis.

The system detects all illustrated peaks and selects a lowest detected frequency of 150 Hz as a selected fundamental frequency peak.

In this example, the system now determines if the two subsequent peaks are at integer-interval harmonic frequencies of the selected fundamental frequency at 150 Hz. The system finds a subsequent second peak at frequency 400 Hz. This peak at frequency 400 Hz, is not at an integer interval of 150 Hz. Therefore the audio stream portion illustrated in the frequency domain of FIG. 5 is not a monophonic stream with a fundamental frequency of 150 Hz. Furthermore, the subsequent frequency peak 600 Hz is not an integer interval of 150 Hz illustrating that the audio stream portion of FIG. 5 is not a monophonic stream with a fundamental frequency of 150 Hz.

As described above, a monophonic signal portion's fundamental frequency can be missing. The system can now determine if this is a monophonic signal with a missing or ghost fundamental frequency. The system can accomplish this by determining if a greatest common devisor frequency exists, between a threshold frequency 40 Hz and the lowest detected frequency peak at 150 Hz, so that the detected peaks are integer intervals of this greatest common devisor. This allows the system to determine if the audio stream is a monophonic stream with a hidden or missing fundamental frequency. Because no greatest common devisor frequency exists for the example shown in FIG. 3, the audio stream portion is determined to be polyphonic.

In this example, the system can sweep through all frequencies between the threshold frequency 40 Hz and the lowest detected peak 164.82 Hz and determine if a greatest common devisor frequency exists so that each peak is an integer multiple of the greatest common devisor. In another example, the system can try frequencies related to the lowest detected frequency peak to determine if a greatest common devisor frequency can be found.

As an illustrative example, the system can select a potential greatest common devisor frequency F0' of one-third of the value of the lowest detected peak at 150 Hz, and determine if the detected peaks are integer intervals of this selected frequency peak F0'. The selected value 50 Hz is within an appropriate range because it is larger than the threshold frequency 40 Hz and the lowest detected frequency peak at 150 Hz.

In this illustrative example the system has selected F0' at 50 Hz. The system will then determine that the audio stream is monophonic with a greatest common devisor frequency and fundamental frequency of 50 Hz if all subsequent peaks are integer intervals of F0' (50 Hz). In the example shown in FIG. 5, the first subsequent frequency peak at 150 Hz is an integer interval of F0' 50 Hz (three times larger). The second subsequent frequency peak at 400 Hz is an integer interval of 50 Hz (eight times greater). The third subsequent frequency peak at 600 Hz is an integer interval of 50 Hz (twelve times greater).

Therefore, because all subsequent peaks are integer intervals of F0', the system determines that the audio stream portion shown in FIG. 5 is monophonic with a missing fundamental frequency and greatest common devisor frequency at 50 Hz. This determination that the audio stream portion is monophonic can be stored in a computer memory.

Figure 6:
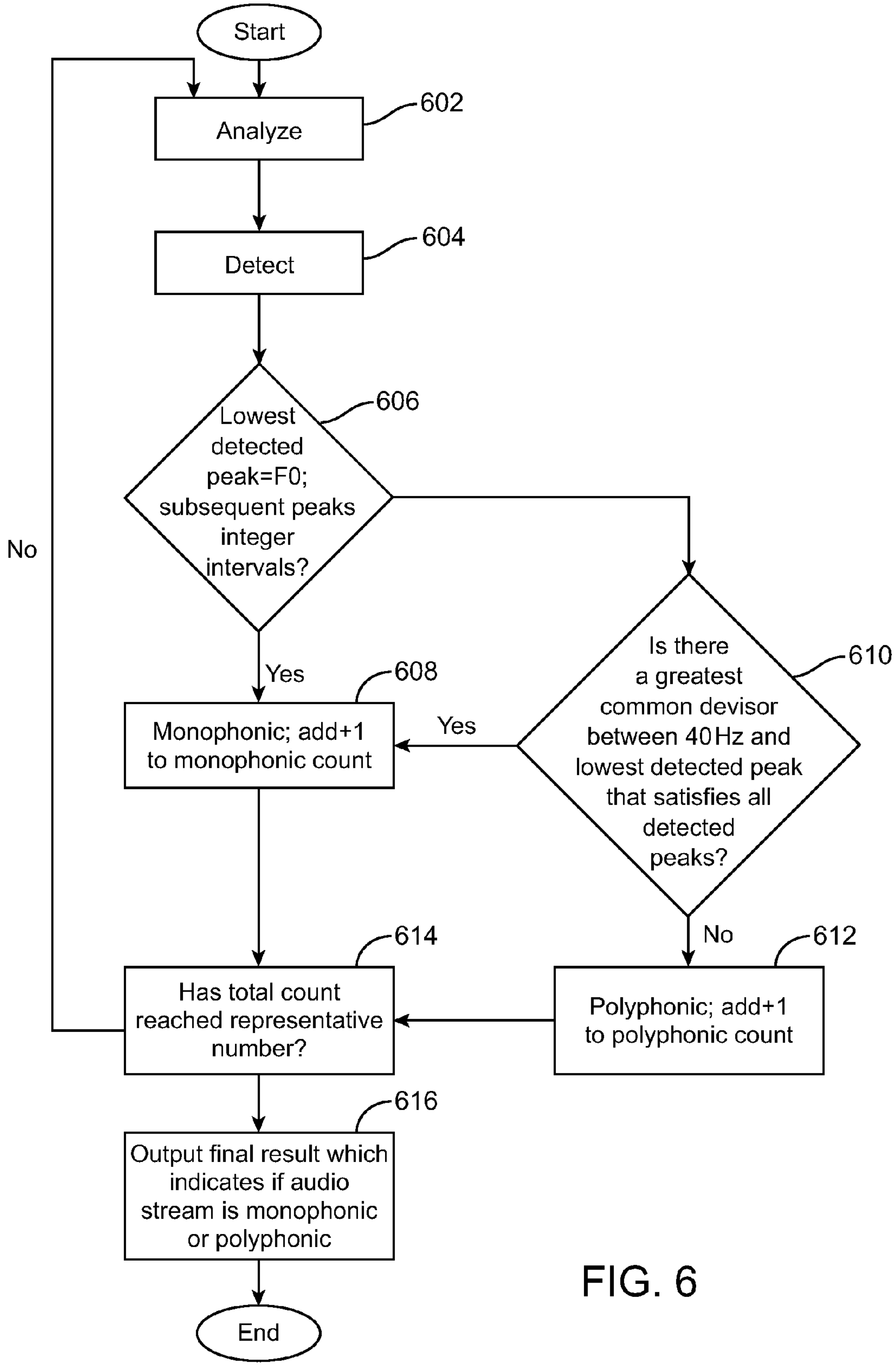
FIG. 6 is a flowchart for determining whether an audio signal is polyphonic or monophonic in a frequency domain.

The method for determining whether a selected portion of an audio stream contains monophonic or polyphonic audio data, comprising as described above may be illustrated by the flowchart shown in FIG. 6. As shown in block 602, the method includes analyzing, with a processor, audio data in a selected portion of an audio stream. Analyzing the audio data can include converting the audio stream portion from a time domain to a frequency domain representation.

As shown in block 604, the method includes detecting, with the processor, a plurality of frequency peaks in the audio data, where each detected peak has a minimum predefined amplitude.

As shown in block 606, the method includes considering a lowest detected frequency peak as F0 and determining if all subsequent frequency peaks are substantially integer intervals of F0. If all subsequent peaks are at integer intervals of F0, the audio signal portion is determined to be monophonic as shown in block 608 and a +1 is added to a monophonic count.

If at least one successive detected frequency peak is not substantially an integer multiple of the fundamental frequency F0 considered, the method then includes considering a hidden fundamental frequency 610 by determining if a greatest common devisor frequency F0' exists, between a lower threshold, such as 40 Hz, and the lowest detected frequency peak, so that each detected frequency peak is an integer interval of the greatest common devisor frequency.

If a greatest common devisor frequency exists, so that each detected frequency peak is an integer interval of the greatest common devisor, the method then returns to block 608. Block 608 illustrates determining that the selected portion of the audio stream contains monophonic audio data if each successive detected peak is substantially an integer multiple of the greatest common devisor frequency F0'. The method then includes block 612, determining that the selected portion of the audio stream contains polyphonic audio data if any one of the successive detected peaks is not substantially an integer multiple of the fundamental frequency F0 or a greatest common devisor frequency is not found to exist between the lower threshold and lowest detected frequency peak. In block 612, a polyphonic counter is increased by +1.

The method then proceeds to block 614, to determine if an overall count (monophonic count plus polyphonic count) has reached a set value. The overall count is defined so that the determination of monophonic or polyphonic becomes representative for the complete audio stream.

If the overall count has not yet reached a set value, the method returns to block 602 and analyzes a subsequent portion of the audio stream to increase accuracy. If the overall count has reached the set value, a calculation is performed 616 to determine a final result. The final result is calculated by comparing the two scores. In this embodiment the final result equals the (monophonic score−polyphonic score)/(monophonic score+polyphonic score). In this embodiment, the final result is a value between −1 and +1. If the final result is greater than zero the stream is monophonic. If the final result is less than zero the stream is polyphonic. In this embodiment, the closer the result value is to either 1 or −1, the more robust the final result determination is.

In another example, the method can include determining that the audio stream portion does not contain any relevant peaks at all, and thus none of the score counters is increased. This case can arise for silent passages in the audio stream.

This method includes an embodiment where a successive detected peak is substantially an integer multiple if its frequency value lies within a predetermined frequency band surrounding an integer multiple of the detected lowest frequency peak.

The method can also include applying a different preselected audio data processing algorithm to the selected portion of the audio stream depending upon whether the selected portion was determined to contain monophonic audio data or polyphonic audio data. For example, a computer can automatically apply a monophonic time-stretching algorithm to a monophonic data or a polyphonic time-stretching algorithm to polyphonic data.

In another example, a computer-implemented method for determining whether a selected portion of an audio stream contains monophonic or polyphonic audio data is disclosed. The method includes analyzing, with a processor, audio data in a selected portion of an audio stream. The method includes detecting, with the processor, a plurality of frequency peaks in the audio data, where each detected peak has minimum predefined amplitude. The method then includes determining, with the processor, whether the selected portion of the audio stream contains monophonic audio data. This is done by considering a selected frequency peak as corresponding to a fundamental frequency F0 based on the plurality of detected frequency peaks. The method then includes comparing the fundamental frequency F0 with a predetermined number of successive detected peaks of the plurality of detected frequency peaks. The method then includes determining that the selected portion of the audio stream contains monophonic audio data if each successive detected peak is substantially an integer multiple of the fundamental frequency F0. The method includes determining that the selected portion of the audio stream contains polyphonic audio data if any one of the successive detected peaks is not substantially an integer multiple of the fundamental frequency F0. This method includes an embodiment where a successive detected peak is substantially an integer multiple if its frequency value lies within a predetermined frequency band surrounding an integer multiple of the detected lowest frequency peak.

This method can further include applying a different preselected audio data processing algorithm to the selected portion of the audio stream depending upon whether the selected portion was determined to contain monophonic audio data or polyphonic audio data. The method can also include an embodiment where the selected frequency peak is considered to be a lowest detected frequency peak. The method can also include an embodiment where the selected frequency peak is estimated to be one-half the value of a lowest detected frequency peak. This embodiment can be useful is a monophonic audio stream portion contains a missing or ghost fundamental frequency.

Another computer-implemented method for determining whether a selected portion of an audio stream contains monophonic or polyphonic audio data is disclosed. The method includes analyzing, with a processor, audio data in a selected portion of an audio stream. The method includes detecting, with the processor, a plurality of frequency peaks in the audio data, where each detected peak has a minimum predefined amplitude.

The method then includes determining, with the processor, whether the selected portion of the audio stream contains monophonic audio data. The method accomplishes this by considering a lowest detected frequency peak as corresponding to a fundamental frequency F0. The method includes comparing the fundamental frequency F0 with a predetermined number of successive detected peaks of the plurality of detected frequency peaks. The method includes determining that the selected portion of the audio stream contains monophonic audio data if each successive detected peak is substantially an integer multiple of the fundamental frequency F0. If at least one successive detected frequency peak is not substantially an integer multiple of the fundamental frequency F0 considered as the lowest detected frequency peak, the method includes considering a lowest detected frequency peak as corresponding to a first harmonic frequency F1, comparing the first harmonic frequency F1 with a predetermined number of successive detected peaks of the plurality of detected frequency peaks, determining that the selected portion of the audio stream contains monophonic audio data if each successive detected peak is substantially an integer multiple or a x.5 multiple of the first harmonic frequency F1, where x is an integer. The method includes determining that the selected portion of the audio stream contains polyphonic audio data if any one of the successive detected peaks is not substantially an integer multiple of the fundamental frequency F0 or a x.5 multiple of the first harmonic frequency F1.

The computer-implemented method includes an embodiment where a successive detected peak is substantially an integer multiple if its frequency value lies within a predetermined frequency band surrounding an integer multiple of the detected lowest frequency peak. The method can also include applying a different preselected audio data processing algorithm to the selected portion of the audio stream depending upon whether the selected portion was determined to contain monophonic audio data or polyphonic audio data.

Another exemplary method for determining whether a selected portion of an audio stream contains monophonic or polyphonic audio data. The method includes analyzing, with a processor, audio data in a selected portion of an audio stream. The method includes detecting, with the processor, a plurality of frequency peaks in the audio data, where each detected peak has a minimum predefined amplitude. The method then includes determining, with the processor, whether the selected portion of the audio stream contains monophonic audio data, by considering a lowest detected frequency peak as corresponding to a fundamental frequency F0, comparing the fundamental frequency F0 with a predetermined number of successive detected peaks of the plurality of detected frequency peaks, and determining that the selected portion of the audio stream contains monophonic audio data if each successive detected peak is substantially an integer multiple of the fundamental frequency F0.

If at least one successive detected frequency peak is not substantially an integer multiple of the fundamental frequency F0 considered as the lowest detected frequency peak the method includes determining that the selected portion of the audio stream contains monophonic data if a greatest common devisor frequency exists between a threshold frequency and the lowest detected frequency peak, wherein each detected peak is an integer multiple of the greatest common devisor frequency. The method includes determining that the selected portion of the audio stream contains polyphonic audio data if any one of the successive detected peaks is not substantially an integer multiple of the fundamental frequency F0 and if no greatest common devisor frequency exists between the threshold frequency and the lowest detected frequency peak.

Figure 7:
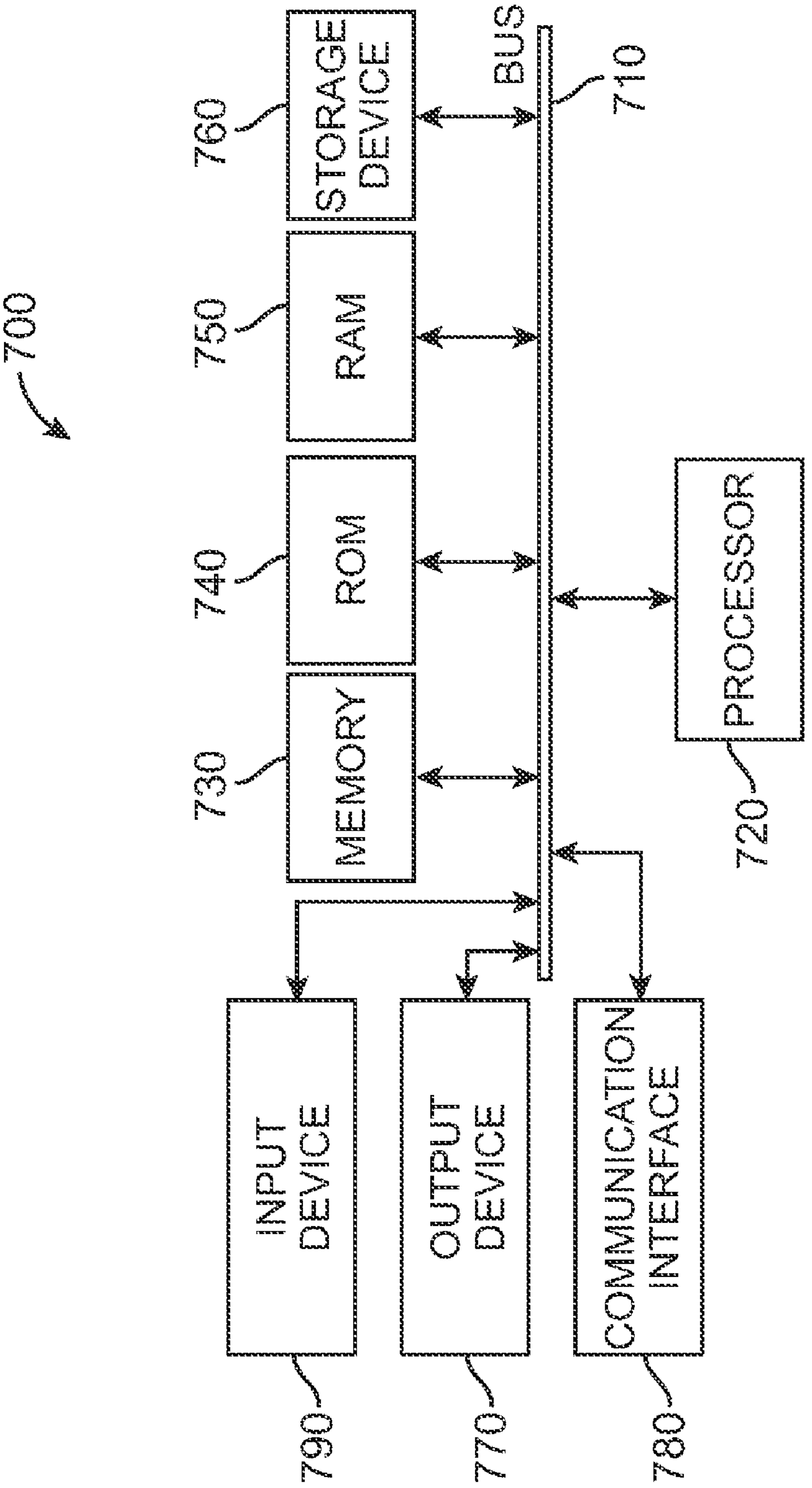
FIG. 7 illustrates hardware components associated with a system embodiment.

FIG. 7 illustrates the basic hardware components associated with the system embodiment of the disclosed technology. As shown in FIG. 7, an exemplary system includes a general-purpose computing device 700, including a processor, or processing unit (CPU) 720 and a system bus 710 that couples various system components including the system memory such as read only memory (ROM) 740 and random access memory (RAM) 750 to the processing unit 720. Other system memory 730 may be available for use as well. It will be appreciated that the invention may operate on a computing device with more than one CPU 720 or on a group or cluster of computing devices networked together to provide greater processing capability. The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices such as a hard disk drive 760, a magnetic disk drive, an optical disk drive, tape drive or the like. The storage device 760 is connected to the system bus 710 by a drive interface. The drives and the associated computer-readable media provide nonvolatile storage of computer-readable instructions, data structures, program modules and other data for the computing device 700. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer-readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 700, an input device 790 represents any number of input mechanisms such as a microphone for an acoustic guitar, electric guitar, other polyphonic instruments, a touch-sensitive screen for gesture or graphical input, keyboard, mouse, motion input, speech and so forth. The device output 770 can also be one or more of a number of output mechanisms known to those of skill in the art, such as a display or speakers. In some instances, multimodal systems enable a user to provide multiple types of input to communicate with the computing device 700. The communications interface 780 generally governs and manages the user input and system output. There is no restriction on the disclosed technology operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including but not limited to hardware capable of executing software. For example the functions of one or more processors shown in FIG. 7 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The technology can take the form of an entirely hardware-based embodiment, an entirely software-based embodiment, or an embodiment containing both hardware and software elements. In one embodiment, the disclosed technology can be implemented in software, which includes but may not be limited to firmware, resident software, microcode, etc. Furthermore, the disclosed technology can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers may not be included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk read only memory (CD-ROM), compact disk read/write (CD-R/W), and DVD. Both processors and program code for implementing each as aspects of the technology can be centralized and/or distributed as known to those skilled in the art.

The above disclosure provides examples within the scope of claims, appended hereto or later added in accordance with applicable law. However, these examples are not limiting as to how any disclosed embodiments may be implemented, as those of ordinary skill can apply these disclosures to particular situations in a variety of ways.

The invention claimed is:

1. A computer-implemented method for determining whether a selected portion of an audio stream contains monophonic or polyphonic audio data, comprising:

analyzing, with a processor, audio data in a selected portion of an audio stream;

detecting, with the processor, a plurality of frequency peaks in the audio data, where each detected peak has a minimum predefined amplitude;

determining, with the processor, whether the selected portion of the audio stream contains monophonic audio data, by selecting a greatest common divisor frequency inclusively between a threshold frequency and a fundamental frequency F0 based on the plurality of detected frequency peaks, wherein the threshold frequency is less than the fundamental frequency F0, comparing the greatest common divisor frequency with a predetermined number of successive detected peaks of the plurality of detected frequency peaks, determining that the selected portion of the audio stream contains monophonic audio data if each successive detected peak is substantially an integer multiple of the greatest common divisor frequency, and determining that the selected portion of the audio stream contains polyphonic audio data if any one of the successive detected peaks is not substantially an integer multiple of the greatest common divisor frequency.

2. The computer-implemented method of claim 1, wherein a successive detected peak is substantially an integer multiple if its frequency value lies within a predetermined frequency band surrounding an integer multiple of the detected lowest frequency peak.

3. The computer-implemented method of claim 1, further comprising applying a different preselected audio data processing algorithm to the selected portion of the audio stream depending upon whether the selected portion was determined to contain monophonic audio data or polyphonic audio data.

4. The computer-implemented method of claim 1, wherein the greatest common divisor frequency is considered to be a lowest detected frequency peak.

5. The computer-implemented method of claim 1, wherein the greatest common divisor frequency is estimated to be one-half the value of a lowest detected frequency peak.

6. A computer-implemented method for determining whether a selected portion of an audio stream contains monophonic or polyphonic audio data, comprising:

analyzing, with a processor, audio data in a selected portion of an audio stream;

detecting, with the processor, a plurality of frequency peaks in the audio data, where each detected peak has a minimum predefined amplitude;

determining, with the processor, whether the selected portion of the audio stream contains monophonic audio data, by considering a lowest detected frequency peak as corresponding to a fundamental frequency F0, comparing the fundamental frequency F0 with a predetermined number of successive detected peaks of the plurality of detected frequency peaks, determining that the selected portion of the audio stream contains monophonic audio data if each successive detected peak is substantially an integer multiple of the fundamental frequency F0, if at least one successive detected frequency peak is not substantially an integer multiple of the fundamental frequency F0 considered as the lowest detected frequency peak, considering a lowest detected frequency peak as corresponding to a first harmonic frequency F1, comparing the first harmonic frequency F1 with a predetermined number of successive detected peaks of the plurality of detected frequency peaks, determining that the selected portion of the audio stream contains monophonic audio data if each successive detected peak is substantially an integer multiple or a x.5 multiple of the first harmonic frequency F1, where x is an integer;

determining that the selected portion of the audio stream contains polyphonic audio data if any one of the successive detected peaks is not substantially an integer multiple of the fundamental frequency F0 or a x.5 multiple of the first harmonic frequency F1.

7. The computer-implemented method of claim 6, wherein a successive detected peak is substantially an integer multiple if its frequency value lies within a predetermined frequency band surrounding an integer multiple of the detected lowest frequency peak.

8. The computer-implemented method of claim 6, further comprising applying a different preselected audio data processing algorithm to the selected portion of the audio stream depending upon whether the selected portion was determined to contain monophonic audio data or polyphonic audio data.

9. A computer-implemented method for determining whether a selected portion of an audio stream contains monophonic or polyphonic audio data, comprising:

analyzing, with a processor, audio data in a selected portion of an audio stream;

detecting, with the processor, a plurality of frequency peaks in the audio data, where each detected peak has a minimum predefined amplitude;

determining, with the processor, whether the selected portion of the audio stream contains monophonic audio data, by considering a lowest detected frequency peak as corresponding to a fundamental frequency F0, comparing the fundamental frequency F0 with a predetermined number of successive detected peaks of the plurality of detected frequency peaks, determining that the selected portion of the audio stream contains monophonic audio data if each successive detected peak is substantially an integer multiple of the fundamental frequency F0, if at least one successive detected frequency peak is not substantially an integer multiple of the fundamental frequency F0 considered as the lowest detected frequency peak, considering a lowest detected frequency peak as corresponding to a first harmonic frequency F1, comparing a predetermined number of successive detected peaks of the plurality of detected frequency peaks with an estimated fundamental frequency F0' determined to be one-half the value of F1, determining that the selected portion of the audio stream contains monophonic audio data if each successive detected peak is substantially an integer multiple of the estimated fundamental frequency F0'; and determining that the selected portion of the audio stream contains polyphonic audio data if any one of the successive detected peaks is not substantially an integer multiple of the fundamental frequency F0 or the estimated fundamental frequency F0'.

10. The computer-implemented method of claim 9, wherein a successive detected peak is substantially an integer multiple if its frequency value lies within a predetermined frequency band surrounding an integer multiple of the detected lowest frequency peak.

11. The computer-implemented method of claim 9, further comprising applying a different preselected audio data processing algorithm to the selected portion of the audio stream depending upon whether the selected portion was determined to contain monophonic audio data or polyphonic audio data.

12. A computer-implemented method for determining whether a selected portion of an audio stream contains monophonic or polyphonic audio data, comprising:

analyzing, with a processor, audio data in a selected portion of an audio stream; detecting, with the processor, a plurality of frequency peaks in the audio data, where each detected peak has a minimum predefined amplitude;

determining, with the processor, whether the selected portion of the audio stream contains monophonic audio data, by considering a lowest detected frequency peak as corresponding to a fundamental frequency F0, comparing the fundamental frequency F0 with a predetermined number of successive detected peaks of the plurality of detected frequency peaks, determining that the selected portion of the audio stream contains monophonic audio data if each successive detected peak is substantially an integer multiple of the fundamental frequency F0, if at least one successive detected frequency peak is not substantially an integer multiple of the fundamental frequency F0 considered as the lowest detected frequency peak, determining that the selected portion of the audio stream contains monophonic data if a greatest common devisor frequency exists between a threshold frequency and the lowest detected frequency peak, wherein each detected peak is an integer multiple of the greatest common devisor frequency; and determining that the selected portion of the audio stream contains polyphonic audio data if any one of the successive detected peaks is not substantially an integer multiple of the fundamental frequency F0 and if no greatest common devisor frequency exists between the threshold frequency and the lowest detected frequency peak.

13. The computer-implemented method of claim 12, wherein the threshold frequency is 40 Hz.

14. An apparatus for determining whether a selected portion of an audio stream contains monophonic or polyphonic audio data, comprising:

a processor configured to analyze audio data in a selected portion of an audio stream; the processor configured to detect a plurality of frequency peaks in the audio data, where each detected peak has a minimum predefined amplitude;

the processor configured to determine whether the selected portion of the audio stream contains monophonic audio data, by selectin a greatest common divisor frequency inclusively between a threshold frequency and a fundamental frequency F0 based on the plurality of detected frequency peaks, wherein the threshold frequency is less than the fundamental frequency F0, comparing the greatest common divisor frequency with a predetermined number of successive peaks of the plurality of detected frequency peaks, determining that the selected portion of the audio stream contains monophonic audio data if each successive detected peak is substantially an integer multiple of the greatest common divisor frequency, and determining that the selected portion of the audio stream contains polyphonic audio data if any one of the successive detected peaks is not substantially an integer multiple of the greatest common divisor frequency.

15. The apparatus of claim 14, wherein the processor detects a successive detected peak is substantially an integer multiple if its frequency value lies within a predetermined frequency band surrounding an integer multiple of the detected lowest frequency peak.

16. The apparatus of claim 14, wherein the processor is configured to apply a different preselected audio data processing algorithm to the selected portion of the audio stream depending upon whether the selected portion was determined to contain monophonic audio data or polyphonic audio data.

17. The apparatus of claim 14, wherein the processor considers the greatest common divisor frequency to be a lowest detected frequency peak.

18. The apparatus of claim 14, wherein the processor estimates the greatest common divisor frequency to be one-half the value of a lowest detected frequency peak.

19. An apparatus for determining whether a selected portion of an audio stream contains monophonic or polyphonic audio data, comprising:

a processor configured to analyze audio data in a selected portion of an audio stream;

the processor configured to detect a plurality of frequency peaks in the audio data, where each detected peak has a minimum predefined amplitude;

the processor configured to determine whether the selected portion of the audio stream contains monophonic audio data, by considering a lowest detected frequency peak as corresponding to a fundamental frequency F0, comparing the fundamental frequency F0 with a predetermined number of successive detected peaks of the plurality of detected frequency peaks, determining that the selected portion of the audio stream contains monophonic audio data if each successive detected peak is substantially an integer multiple of the fundamental frequency F0, if at least one successive detected frequency peak is not substantially an integer multiple of the fundamental frequency F0 considered as the lowest detected frequency peak, the processor configured to consider a lowest detected frequency peak as corresponding to a first harmonic frequency F1, the processor configured to compare a predetermined number of successive detected peaks of the plurality of detected frequency peaks with an estimated fundamental frequency F0' determined to be one-half the value of F1, the processor configured to determine that the selected portion of the audio stream contains monophonic audio data if each successive detected peak is substantially an integer multiple of the estimated fundamental frequency F0'; and the processor configured to determine that the selected portion of the audio stream contains polyphonic audio data if any one of the successive detected peaks is not substantially an integer multiple of the fundamental frequency F0 or the estimated fundamental frequency F0'.

20. The apparatus of claim 19, wherein a successive detected peak is substantially an integer multiple if its frequency value lies within a predetermined frequency band surrounding an integer multiple of the detected lowest frequency peak.

21. The apparatus of claim 20, wherein the processor is configured to apply a different preselected audio data processing algorithm to the selected portion of the audio stream depending upon whether the selected portion was determined to contain monophonic audio data or polyphonic audio data.

22. A product comprising:

a non-transitory machine-readable medium; and machine-executable instructions stored on the machine-readable medium for causing a computer to perform the method comprising:

analyzing, with a processor, audio data in a selected portion of an audio stream;

detecting, with the processor, a plurality of frequency peaks in the audio data, where each detected peak has a minimum predefined amplitude;

determining, with the processor, whether the selected portion of the audio stream contains monophonic audio data, by considering a lowest detected frequency peak as corresponding to a fundamental frequency F0, comparing the fundamental frequency F0 with a predetermined number of successive detected peaks of the plurality of detected frequency peaks, determining that the selected portion of the audio stream contains monophonic audio data if each successive detected peak is substantially an integer multiple of the fundamental frequency F0, if at least one successive detected frequency peak is not substantially an integer multiple of the fundamental frequency F0 considered as the lowest detected frequency peak, determining that the selected portion of the audio stream contains monophonic data if a greatest common devisor frequency exists between a threshold frequency and the lowest detected frequency peak, wherein each detected peak is an integer multiple of the greatest common devisor frequency; and determining that the selected portion of the audio stream contains polyphonic audio data if any one of the successive detected peaks is not substantially an integer multiple of the fundamental frequency F0 and if no greatest common devisor frequency exists between the threshold frequency and the lowest detected frequency peak.

23. The product of claim 22, wherein a successive detected peak is substantially an integer multiple if its frequency value lies within a predetermined frequency band surrounding an integer multiple of the detected lowest frequency peak.

24. The product of claim 22, further comprising machine-executable instructions stored on the machine-readable medium for causing a computer to perform applying a different preselected audio data processing algorithm to the selected portion of the audio stream depending upon whether the selected portion was determined to contain monophonic audio data or polyphonic audio data.

25. The method of claim herein the threshold frequency is about 40 Hz.

26. The method of claim 14 wherein the threshold frequency is about 40 Hz.

* * * * *